June 14, 1932. H. E. WALKER 1,862,615
PROCESSING REEL
Filed Sept. 10, 1928
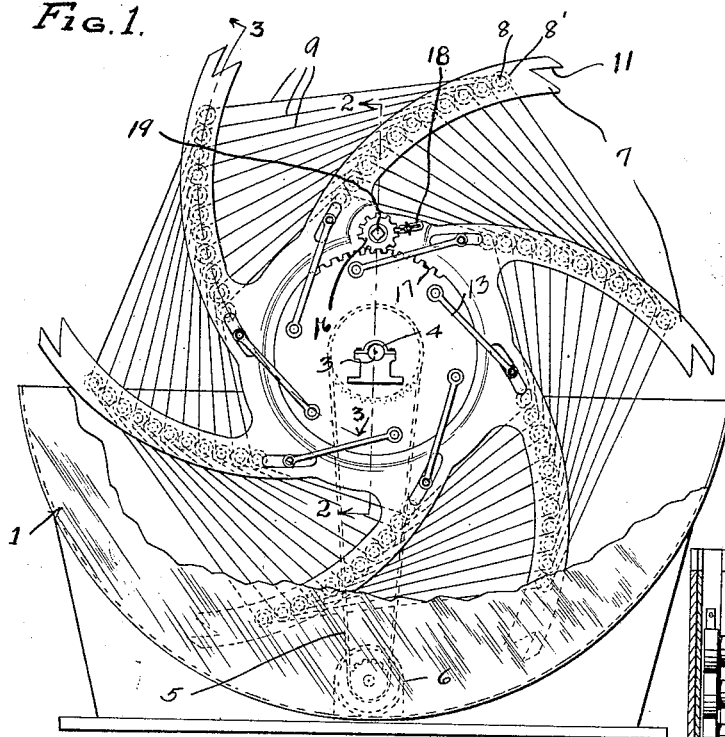
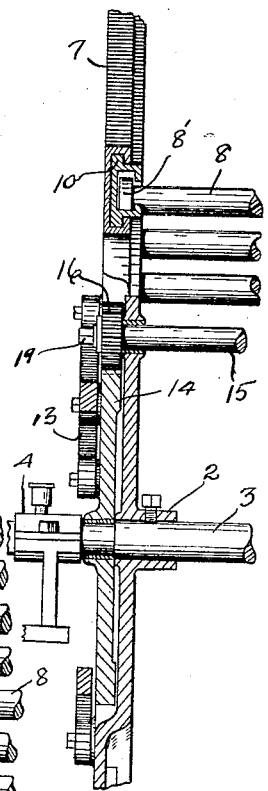
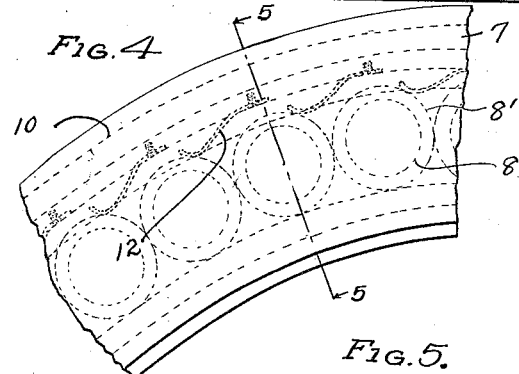
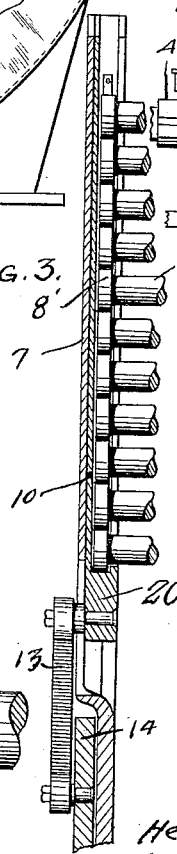
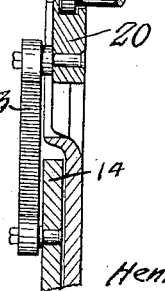
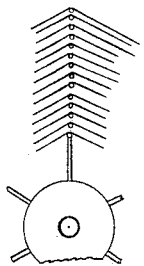
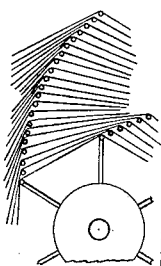
INVENTOR.
Henry E. Walker
BY Miller & Boyken
ATTORNEYS.

Patented June 14, 1932

1,862,615

UNITED STATES PATENT OFFICE

HENRY ERWIN WALKER, OF PORTLAND, OREGON

PROCESSING REEL

Application filed September 10, 1928. Serial No. 305,006.

This invention relates to processing reels of the general type shown and described in my copending application for patent on a dyeing reel filed under Serial No. 261,520 on March 14, 1928, now Patent No. 1,799,713.

The objects of the invention are to provide improvements in a reel of the character mentioned.

In the reel of the copending case mentioned, confronting arms at opposite ends of the reel received rods extending parallel to the axis of the reel for winding ribbon or cloth bands about the reel in overlapping coiled relation separated by the rods, and the present invention deals with the construction of the arms and the position of the rods thereon and the control of the tension of the band wound about the arms for processing, hence the present drawing and description will be quite limited to these parts and reference will be had to the prior case for a complete description of the whole apparatus.

In the drawing Fig. 1 is a side elevation of a reel provided with my improved arm and rod arrangement, and it is shown mounted for revolution in a tank, the side of the tank being broken away.

Fig. 2 is an enlarged section of the forward hub of the reel of Fig. 1 as seen from the line 2—2 thereof.

Fig. 3 is an enlarged section of one arm of the reel of Fig. 1 as seen from the line 3—3 thereof.

Fig. 4 is an enlarged portion of one of the arms of Fig. 1.

Fig. 5 is a cross section of Fig. 4 as seen from the line 5—5 of Fig. 4.

Figs. 6 and 7 are diagrams showing the relative capacities of reels of the same diameter constructed respectively without and with my improvement.

In detail the drawing shows a tank or processing vat conventionally indicated at 1 and a reel revolvably mounted to rotate therein.

The reel comprises a pair of flanges carried on hubs 2, said flanged hubs secured in spaced confronting relation on a shaft 3 supported in bearings 4 on the edge of the tank, the shaft being revolved by any suitable gearing or transmission arrangement as symbolized by the chain drive 5 to motor 6.

The flanges or hubs 2 are provided with confronting arms 7 to support each a plurality of horizontally extending rods 8 adapted to support bands of cloth or other material in spaced overlapping layers as at 9.

The arms in the present showing are not radial to the shaft, but extend at all points at an inclination to the radial lines of a circle concentric with the axis of the reel and each arm is curved toward the next one as they extend outwardly, the row of ribbon supporting rods 8 carried by each arm taking of course the same form as described for the arm.

The object for the special shape of the arms and their tangential arrangement is that it permits of a much larger diameter rod being used while giving an equal number of turns of ribbon about the reel, or with the same size rods as used in the prior radial arms would give many more turns of ribbon about a given size reel. The reason for this is that if large rods be used in radial arrangement, one directly outward from the other as in Fig. 6 each layer is spaced on a radial line a little more than the diameter of the rods, whereas when the arm is tangential or curved tangentially as in Fig. 7 its actual length is greater on a given diameter of reel, hence it will accommodate more rods. Figs. 6 and 7 show the difference in number of layers of ribbon carried on two reels of the same outside diameter, Fig. 6 being the radial arrangement and Fig. 7 the curved tangential arrangement.

A plain tangential arrangement of arms would of course give a capacity lying between that of the figures shown.

The rods arranged as described may be inserted through holes in the arms in the well known way or they may be received in slotted or channeled arms. The present case shows the rods 8 as provided with heads 8′ which are received in an auxiliary channel arm 10 provided with a stop or rod supporting member 20 at its inner end as indicated in Fig. 3 to prevent the rods 8 from falling out of the inner end of the channel and to provide a means for moving the rods supported thereon, inward or outward along the arm 7 as will be later described slidably mounted on the main arm 7, the latter being formed as a channel to loosely embrace the auxiliary channel.

The outer ends of the arms 7 are offset or hooked as at 11 so as to pick up rods from a supply not shown, in the manner described in my copending case, and the auixilary channel arms are provided with means for preventing the rods as received from falling out before sufficient ribbon has been wound about them to hold them in place, such means being here indicated as light springs 12 secured to the auxiliary channel arms and bearing against the heads of the rods to form a species of ratchet holding the rods against accidental displacement yet permitting their forcible removal as shown in said copending case. The present case differing from the prior case in the means for changing the position of the rods on the arms to vary the tension of the ribbon or other band of material being processed on the reel.

This is accomplished by bodily moving the auxiliary channel arms 10 inwardly or outwardly on the fixed arms 7, and means is provided for doing this on all arms simultaneously. To this end I pivotally connect the stop or rod supporting member 20 carried at the inner end of each auxiliary channel arm through a slot in the fixed arm 7 to one end of a pitman rod 13 and pivotally connect the other end of the rod to a flange 14 rotatably mounted on the shaft 3 and lying against the outside of the reel hub flange 2.

Each auxiliary channel arm is thus connected and the same construction is repeated at the opposite end of the reel, and means is provided for revolving the flanges 14 relative to the hub flanges 2 so as to push or pull the auxiliary channels outwardly or inwardly. This means comprises a shaft 15 passing through both hub flanges 2 and rotatably supported thereon and provided with pinions 16 at its opposite ends meshing with gear teeth 17 formed for a short distance along the edges of the loose flanges 14 so that upon rotation of the pinions the flanges may be revolved in either direction, and the pinions locked by means of a latch or pawl 18 mounted on the flange carried on hub 2.

One or both ends of the pinion shaft 15 are preferably squared as at 19 so that a hand crank or wrench may be applied for turning the same after unlocking of the latch 18. By this means any required tension or slack may be put upon the layers of ribbon, cloth or other material wound upon the rods of the reel, and since the rods are free to revolve it is evident that an even tension may be maintained throughout.

In considering my improvements as above set forth it will be apparent to any mechanic that other means than the specific means shown may be employed to push the auxiliary arms in and out and I therefore do not limit myself to this construction but cover in my appended claims any variation of the construction which comes within the spirit of the invention.

I claim:

1. A processing reel having a horizontally disposed shaft mounting the reel for rotation and defining the reel axis, arms at the ends of the reel arranged for bodily movement in and out from the reel axis, and means provided for effecting such movement of the arms comprising revolvable members carried by the shaft at opposite ends of the reel, pitman connections from the arms to said members, a second shaft extending from end to end of the reel offset from the reel axis and parallel thereto, gears on said shaft, gear teeth on said revolvable members engaged with said gears, and pawl for locking said gears at any desired point of revolution.

2. A processing reel provided at its ends with a confronting set of fixed arms, auxiliary arms slidably mounted on said fixed arms, said auxiliary arms arranged and adapted for supporting a series of rods extending longitudinally of the reel and in superposed relation to each other along said arms.

3. A structure as specified in claim 2 wherein the fixed arms engage the edges of the auxiliary arms and the auxiliary arms are formed with confronting channels to receive said rods.

4. A structure as specified in claim 2 wherein the fixed arms are slotted adjacent their base and a device is provided extending through the slot and connected to the auxilary arm for slidably moving the same relative to the fixed arm.

5. A structure as specified in claim 2 wherein fixed and auxiliary arms are curved.

6. A structure as specified in claim 2 wherein fixed and auxiliary arms are curved and extend at all points at an inclination to the radial lines of circle around the axis of the reel.

7. A processing reel including a shaft mounting the reel for rotation, said reel provided at its ends with confronting sets of arms, a row of rods supported between each set of confronting arms the rods extending longitudinally of the reel and each row following the form of the arms between which the row of rods is supported, means whereby said rods may be simultaneously moved on said arms for varying the tension of a band wound around the reel on the rods, said means comprising rod supporting members carried by said arms and slidable thereon, revolvable members carried on the reel shaft at opposite ends of the reel, pitman connections secured at an end each to said revolvable members and at the opposite end to each of said rod supporting members respectively.

8. A processing reel, arms at the ends of said reel arranged for bodily movement in and out from the reel axis said arms extending at all points at an inclination to the radial lines of a circle concentric to the axis of the reel, and means provided for effecting such movement of the arms.

9. A processing reel including a shaft mounting the reel for rotation, arms at the ends of the reel arranged for bodily movement in and out from the reel axis and means provided for effecting such movement of the arms comprising revolvable members carried on the reel shaft at opposite ends of the reel, pitman connections from the arms to said members, and means for revolving said members, said arms extending outward from a circle concentric to the reel axis and at an inclination to the radial lines of such circle.

HENRY ERWIN WALKER.